(12) United States Patent
Pan

(10) Patent No.: US 6,934,232 B2
(45) Date of Patent: Aug. 23, 2005

(54) METHOD FOR DETECTING AN UNBALANCED DISK IN AN OPTICAL DISK READING DEVICE

(75) Inventor: Yi-Chuan Pan, Taipei (TW)

(73) Assignee: Lite-On IT Corp. (TW)

(*) Notice: Subject to any disclaimer, the term of this patent is extended or adjusted under 35 U.S.C. 154(b) by 331 days.

(21) Appl. No.: 10/386,785

(22) Filed: Mar. 12, 2003

(65) Prior Publication Data
US 2004/0037194 A1 Feb. 26, 2004

(30) Foreign Application Priority Data
Aug. 23, 2002 (TW) .............................. 91119116

(51) Int. Cl.$^7$ .............................................. G11B 7/00
(52) U.S. Cl. .................................. 369/53.14; 369/53.19
(58) Field of Search ......................... 369/53.12, 53.13, 369/53.14, 53.15, 53.17, 53.19, 44.32, 44.26

(56) References Cited

U.S. PATENT DOCUMENTS 5,399,849 A * 3/1995 Jung ........................ 250/201.5

* cited by examiner

Primary Examiner—Nabil Hindi
(74) Attorney, Agent, or Firm—Raymond Sun

(57) ABSTRACT

A method is provided for determining whether a rotating disk in an optical disk reading device is unbalanced. According to the method, the disk is first rotated at a preset rotational speed, and a lens is then located to a first position. Then, as the lens is moved towards a second position at a predetermined speed, a time duration during which a preliminary signal is generated is determined. The disk is determined to be unbalanced if the time duration exceeds a preset value.

4 Claims, 3 Drawing Sheets

METHOD FOR DETECTING AN UNBALANCED DISK IN AN OPTICAL DISK READING DEVICE

BACKGROUND OF THE INVENTION

1. Field of the Invention

The present invention relates to an optical disk reading device, and in particular, to a method for detecting an unbalanced disk in an optical disk reading device.

2. Description of the Prior Art

The servo-control system of an optical disk reading device (such as a compact disk player) functions to control the position of the objective lens such that when vertical and horizontal excursions of the disk occur due to the rotation of the disk, it is still possible to maintain the focused laser beam on the data layer of the disk to generate an optical reflection signal. This optical reflection signal is the source of the digital signals as well as the feedback signal of the servo-control system.

Ideally, the physical properties of a perfectly circular disk do not change with a change in the position on the disk. For this reason, in theory, rotation of a disk does not in itself cause an excursion in the movement of the disk. However, due to errors that occur during manufacturing, it is very likely that various spots on the disk will have different densities, sometimes even resulting in unique shapes that lead to a non-circular disk. As a result, the centroid of the disk will not coincide with the center of rotation, thereby causing excursions due to the imbalance. In a normal situation, the disk experiences vertical excursions caused by the rotation of the disk, the extent of the focusing error calculated from the optical reflection signal may be used, along with the servo-control system, to generate a control voltage by using a compensator to process the extent of the focusing error. Then, a power amplifier amplifying the control voltage can be used to drive the objective lens (i.e., move the objective lens up and down) to keep the focal point tightly locked on the data layer of the disk.

Under normal conditions, as the disk becomes more unbalanced, a greater the control voltage is needed so that the power amplifier can generate a greater driving force on the objective lens so that data can be read from the disk. However, when the excursion of the disk reaches a certain level, the excursion may cause skipping of tracks, loss of focus and other problems in a optical disk reading device, resulting in failure to properly read data. In addition, because most of the present optical disk reading drives have a high rotational speed of the spindle motor, the noise generated by the friction between the high rotational speed of the unbalanced disk and air will be unacceptable to both the user and the designer. For this reason, a precise and fast identification of the extent of disk excursion, followed by proper adjustment to the maximum speed of the spindle motor, will help achieve a smoother process for data retrieval and reduce the vibration noise of the optical disk reading drive to a tolerable range.

According to a prior art method for identifying an unbalanced disk, the error signals (such as focus and tracking errors) are generated periodically along with the rotational speed of the spindle motor. If the signal is periodically greater than a preset value, then the disk is determined to be unbalanced. However, this prior art method has a few drawbacks. First, this prior art method requires the continuous detection of the status of the error signal. Second, the reason for a periodic change in the values of the error signals is not limited solely to an unbalanced disk, since scratches on the disk may also cause an erroneous identification, so this prior art method cannot always accurately determine whether a disk is unbalanced.

Thus, there remains a need for a method for detecting an unbalanced disk in an optical disk reading device, which overcomes the drawbacks described above.

SUMMARY OF THE DISCLOSURE

It is an object of the present invention to provide a method for accurately detecting an unbalanced disk in an optical disk reading device.

It is another objective of the present invention to detect an unbalanced disk in an optical disk reading device based on the extent of the excursions of the disk. In particular, this pertains to the phenomenon that when a disk rotates, depending on its degree of flatness, the extent of its excursions will increase with the increase in the extent of unbalance. In other words, the range of the excursions of an unbalanced disk will be greater than for a normal disk, so by detecting the range of the excursions of the disk, it is possible to determine whether or not the disk is unbalanced.

In order to accomplish the objects of the present invention, the present invention provides a method of determining whether a rotating disk in an optical disk reading device is unbalanced. According to the method, the disk is first rotated at a preset rotational speed, and a lens is then located to a first position. Then, as the lens is moved towards a second position at a predetermined speed, a time duration during which a preliminary signal is generated is determined. The disk is determined to be unbalanced if the time duration exceeds a preset value.

BRIEF DESCRIPTION OF THE DRAWINGS

FIGS. 3(*a*)(B) and 3(*b*)(B) illustrate the S-curves of the corresponding FEs from the disks in FIGS. 3(*a*)(A) and 3(*b*)(A), respectively.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

Although the principles of the present invention are described below in connection with a pull-in type of compact disk player, the present invention can be applied to all optical disk reading devices, including but not limited to compact disk (CD) player systems, DVD drives, CD/DVD drives, DVD/RW combo drives, car audio drives, etc.

Figure 1:
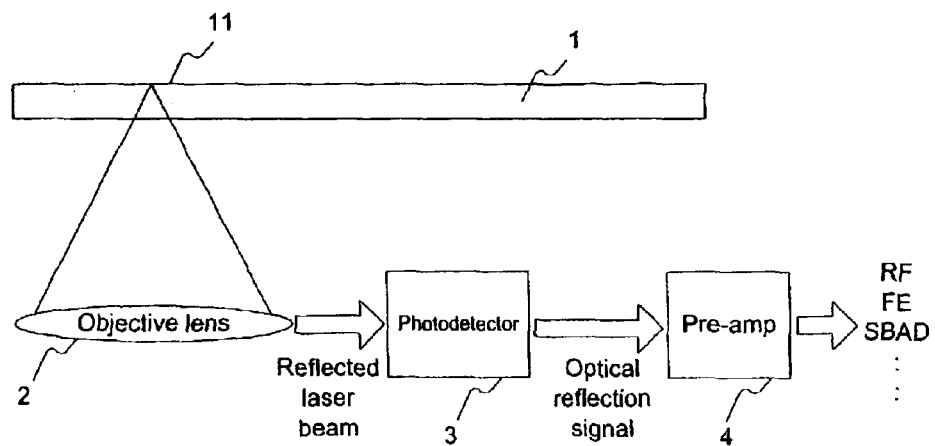
FIG. 1 is a block diagram showing the generation of signals by the internal pre-amp in an optical disk reading device.

FIG. 1 illustrates the general operational principles of an optical disk reading device. The optical disk reading device has an objective lens 2, which focuses a laser beam on the data layer 11 (referred to herein as the "reflection layer 11"). The laser beam reflected by the reflection layer 11 is provided to a photodetector 3 to generate an optical reflection signal, and then a pre-amp 4 outputs some signals, such as RF (radio frequency), FE (focus error), TE (tracking signal error) and SBAD (Sub-Beam Add), etc, by calculating the optical reflection signal. These are conventional signals generated by optical disk reading devices, so their utility and characteristics will not be described in greater detail herein.

According to the method of the present invention, if the reflection layer 11 of disk 1 is located near the focal point, then the pre-amp 4 will generate a signal (such as RF, FE, TE and SBAD, etc.).

Figure 2:
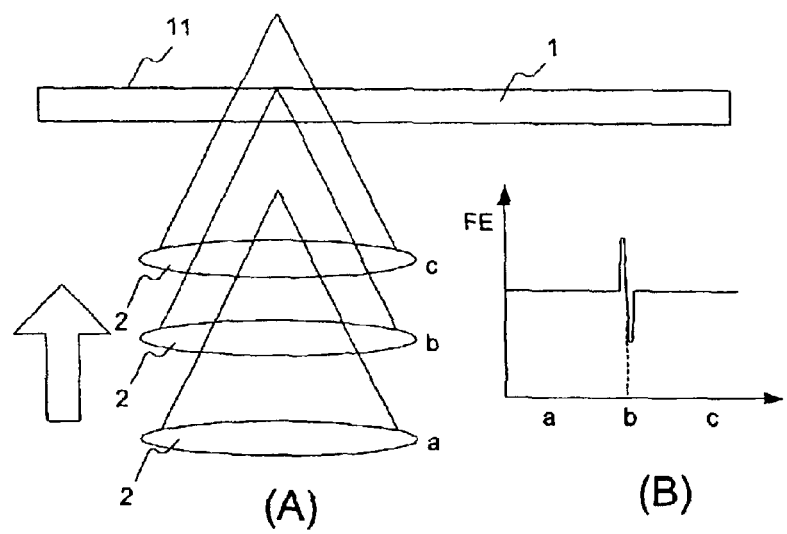
FIG. 2(A) illustrates the extent of excursions of a disk and the corresponding position of the objective lens.
FIG. 2(B) illustrates the S-curve of the corresponding focusing error (FE) from the disk in FIG. 2(A).

When a disk 1 is loaded into the optical disk reading device, the objective lens 2 will be moved toward the rotated disk 1 to find the focus position of the objective lens 1. As shown in FIG. 2(A), the objective lens 2 is moved from the "a" position toward the "c" position. When the focus point passes through the reflection layer 11 (position "b"), the FE (focusing error signal) forms an S-curve, as shown in FIG. 2(B). The focus position of the objective lens 2 can be determined according to the FE.

Figure 3A:
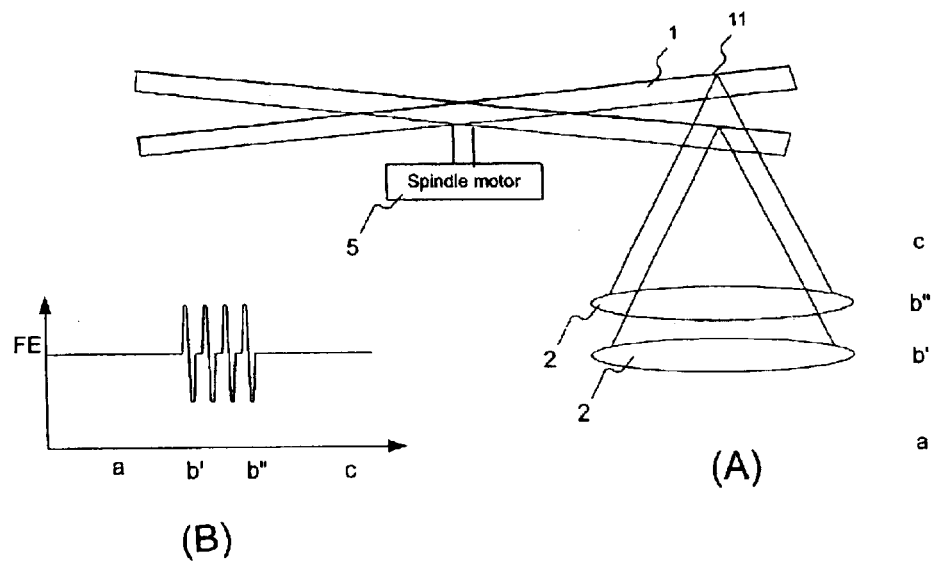
FIGS. 3(*a*)(A) and 3(*b*)(A) illustrate two examples of the relationships between the FE and the extent of the excursions caused by the rotation of the unbalanced disk.

FIGS. 3(a)(A) and 3(b)(A) illustrate two examples of the relationships between the FE and the extent of the excursions caused by the rotation of the unbalanced disk 1. Because the rotational speed of the disk 1 is much greater than the moving speed of the objective lens 2, the focus point of the objective lens 2 can coincide with the reflection layer 11 at least once during the time the disk 1 rotates for one cycle. In this way, when an unbalanced disk 1 is rotating, moving the objective lens 2 from the first position "a" (which has the greatest distance from the reflection layer 11) towards the third position "c" (which has the shortest distance from the reflection layer 11) will also allow for the detection of the extent of the excursions.

Figure 3B:
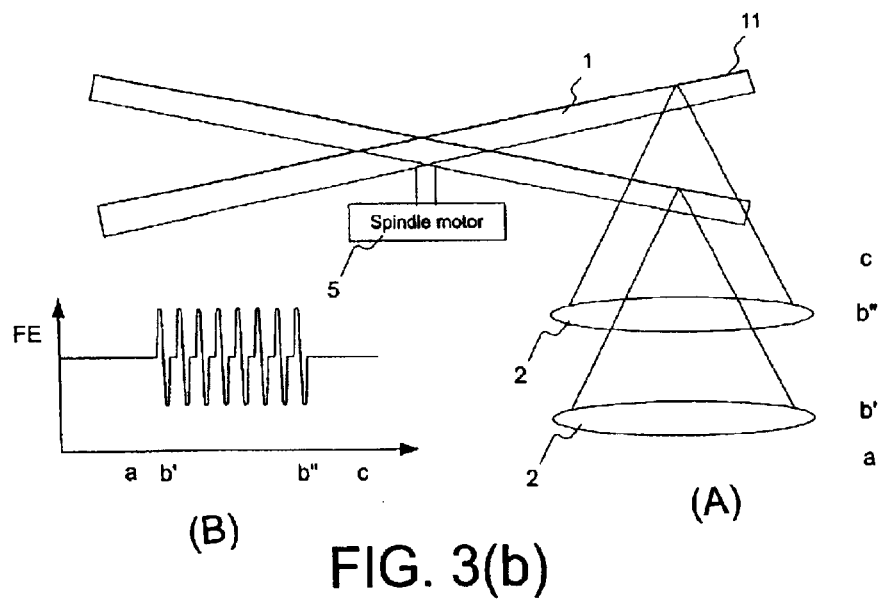

Comparing FIGS. 3(a)(A) and 3(b)(A), the disk 1 in FIG. 3(b)(A) experiences greater excursions than that in FIG. 3(a)(A). When the objective lens 12 moves from the "a" position to the "c" position, the FE can be detected between the "b'" position and the "b''" position. Because the moving speed of the objective lens 12 is a constant, the FE generating duration (i.e., the time during which the focus point continuously coincides with the reflection layer 11) can be detected. The unbalanced disk can be determined based on the FE generating duration. In other words, if the FE generating duration is greater than a preset value, then the disk 1 can be identified as being unbalanced, otherwise, it is identified as being a normal balanced disk 1. This preset value can be defined by the firmware of the optical disk reading device.

The aforementioned rotational speed of the spindle motor can be selected based on the mechanical features of the optical disk reading device. In this regard, the rotational speed of the disk 1 should be much greater than the speed at which the optical read head is moved, and the criterion for the selection is based on the principle that the difference in the extent of excursions between a balanced disk 1 and an unbalanced disk 1 can be increased. The speed of movement (up or down) of the objective lens 2 is, on the other hand, adjusted in a suitable manner based on the moving control of the optical disk reading device.

Figure 4:
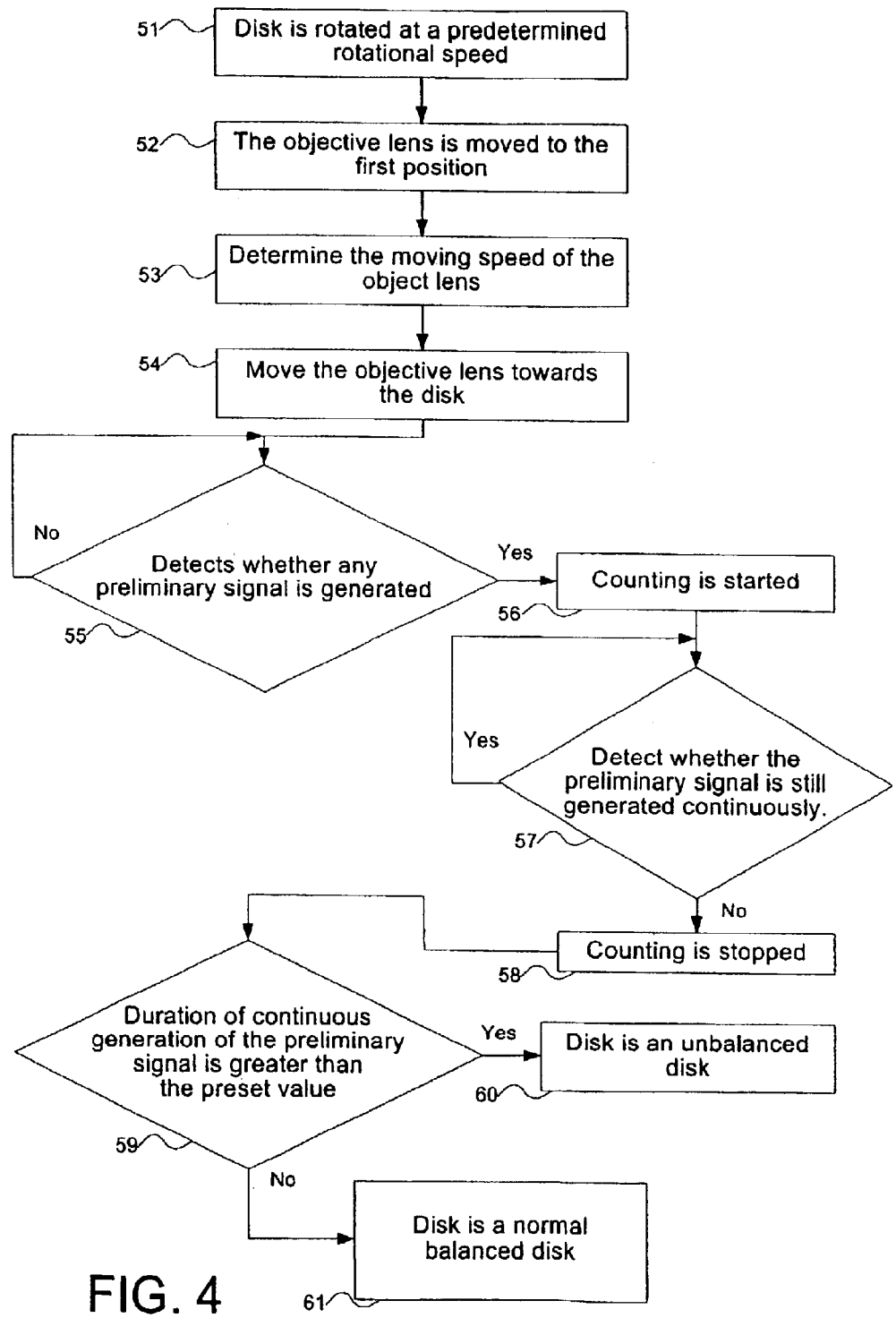
FIG. 4 is a flow chart of a method for identifying an unbalanced disk according to the present invention.

FIG. 4 is a flow chart illustrating a method for the identification of an unbalanced disk 1 according to the present invention. This method can be carried out by firmware, and includes the following steps:

In Step 51, the disk 1 is rotated at a predetermined rotational speed, with the selection of the rotational speed based on the principle that the difference in the extent of excursions between a normal disk and an unbalanced disk can be increased by the rotational speed of the spindle motor. The moving speed of the objective lens 2 is also adjusted in a suitable manner based on the moving control of the system.

In Step 52, the objective lens 2 is lowered to the first position "a", which has the greatest distance from the reflection layer 11, and the laser diode is activated to emit a laser beam through the objective lens 2 to form a focus point.

In Step 53, the moving speed of the objective lens 2 is determined by moving control of the system.

In Step 54, the objective lens 2 is moved towards the disk 1.

Step 55 then detects whether any preliminary signal(FE) is generated. In other words, when the objective lens 2 is moving towards the disk 1, and the focal point is in the vicinity of the reflection layer 11 of the disk 1, the signals detected by the photodetector 3 will generate preliminary signals such as RF, FE, TE and SBAD via the pre-amp 4.

If preliminary signals are generated, this means that the focal point is in the vicinity of the reflection layer 11 of the disk 1 (i.e., position "b" in FIG. 2(A)), then processing proceeds to Step 56.

If there are no preliminary signals (i.e., we are still between position "a" and position "b"), then processing returns to Step 55 to continue the detection for preliminary signals.

In Step 56 (which follows the generation of preliminary signals), counting is started to calculate the duration of the preliminary signal after their generation.

Step 57 then detects whether the preliminary signals are still generated continuously. In other words, this step detects whether the focal point is still within the range of the excursions of the rotating disk 1. If, however, the preliminary signals are not generated continuously (i.e., we are now at position "c" in FIG. 2A)), this means that the objective lens 2 has been moved upwardly to a position that exceeds the highest point of the excursion of the disk 1, and the focal point is outside the range of biased movement of the rotating disk 1.

If preliminary signals are still continuously generated, the processing returns to Step 57, otherwise processing proceeds to Step 58.

In Step 58, the counting is stopped.

Step 59 then determines whether the duration of continuous generation of the preliminary signals (as measured by the count in step 56) is greater than the preset value.

If yes, then processing proceeds to Step 60 where the disk is ruled to be an unbalanced disk 1.

If no, then processing proceeds to Step 61, where the disk is ruled to be a normal balanced disk 1.

Thus, based on the above-described method, when an optical disk reading device is turned on to read data from a disk 1, the disk 1 will undergo a biased movement vertically to varying degrees due to its rotation. Preliminary signals will be generated if the focal point is within the vicinity of the reflection layer 11 of the disk 1. The presence of the preliminary signals, and the duration of the preliminary signals, can be determined. In other words, when a preliminary signal is generated, it indicates that the focal point is in the vicinity of the reflection layer 11 of the disk 1. On the other hand, the duration of the preliminary signal indicates the extent of the excursions of the disk 1; that is, for the objective lens 2 operating at a constant speed, with the vertical excursions caused by the extent of unbalance of disc 1, the time interval is directly proportional to the extent of the excursions. For this reason, when the objective lens 2 is lowered to the first position towards the disk 1, the instant that a preliminary signal is generated represents the contact of the focal point at this point with the position of the excursion at the very bottom of the reflection layer 11 of the disk 1 (as shown in FIGS. 3(a) and 3(b)). The objective lens 2 continues to move upward along the direction of the biased movement of the disk 1, and whether or not a preliminary signal is continuously generated can be detected.

The instant that the continuous generation of preliminary signals stops represents the contact of the focal point with the position of the excursion at the very top of the reflection layer 11 of the disk 1. By using this feature, based on whether or not the time interval is greater than a preset value, the duration of the continuous generation of preliminary signals can be calculated and compared to the preset value. If the time interval is greater than the preset value, then the disk 1 is identified as being unbalanced. On the other hand, if the time interval is less than the preset value, then the disk 1 is identified being balanced.

If the disk 1 is identified being unbalanced, the rotational speed of the spindle motor can be reduced so as to prevent any unpleasant vibration noise caused by the rotation of the disk 1 at high speeds.

Thus, the method for identification of an unbalanced disk in an optical disk reading device according to the present invention is characterized by the following:

(1) By a proper selection of the speed of movement of the objective lens 2 and by setting a threshold for the time of generation of signals for identification of an unbalanced disk alone, it becomes possible to make the most rapid and most precise determination as to whether the disk is balanced or unbalanced.

(2) By including a determination of the duration of the generation of the preliminary signals as part of the determination of whether or not the disk is unbalanced, the method of the present invention can effectively prevent erroroneous judgment.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A method of determining whether a rotating disk in an optical disk reading device is unbalanced, the disk reading device having a lens, and the disk having a reflection layer, the method comprising:

rotating the disk at a preset rotational speed;

locating a lens to a first position;

moving the lens towards a second position at a predetermined speed;

as the lens is moving from the first position to the second position, determining a time duration during which a preliminary signal is generated; and determining the disk to be unbalanced if the time duration exceeds a preset value.

2. The method of claim 1, wherein the first position has the greatest distance between the lens and the disk.

3. The method of claim 1, wherein the second position has the smallest distance between the lens and the disk.

4. The method of claim 1, wherein the step of determining a time duration includes:

starting a count when preliminary signals are generated; and stopping the count when the generation of preliminary signals ceases, with the count representing the time duration.

* * * * *